(12) United States Patent
Kang et al.

(10) Patent No.: US 8,256,909 B2
(45) Date of Patent: Sep. 4, 2012

(54) ANTIGLARE FILM HAVING PARTICLES FOR USE IN A DISPLAY AND A METHOD FOR MANUFACTURING THE ANTIGLARE FILM

(75) Inventors: Kyoung Ku Kang, Uiwang-si (KR); Jee Woung Kim, Uiwang-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 0 days.

(21) Appl. No.: 13/168,341

(22) Filed: Jun. 24, 2011

(65) Prior Publication Data

US 2011/0255169 A1      Oct. 20, 2011

Related U.S. Application Data

(63) Continuation of application No. PCT/KR2008/007782, filed on Dec. 30, 2008.

(30) Foreign Application Priority Data

Dec. 24, 2008   (KR) ........................ 10-2008-0133621

(51) Int. Cl.
   *G02B 27/00*      (2006.01)

(52) U.S. Cl. ........................................ 359/601; 428/327
(58) Field of Classification Search ........................ None
   See application file for complete search history.

(56) References Cited

U.S. PATENT DOCUMENTS

| | | | |
|---|---|---|---|
| 7,645,502 B2 | 1/2010 | Mikami et al. | |
| 7,864,425 B2 * | 1/2011 | Okada et al. | 359/569 |
| 2006/0057344 A1 | 3/2006 | Sakurai et al. | |
| 2008/0260997 A1 | 10/2008 | Iwata et al. | |

FOREIGN PATENT DOCUMENTS

| | | |
|---|---|---|
| JP | 2003-347218 | 12/2003 |
| KR | 10-2006-0051122 A | 5/2006 |
| KR | 10-2008-0085742 A | 9/2008 |
| KR | 10-2008-0111173 A | 12/2008 |
| WO | WO 2007032217 A1 * | 3/2007 |

* cited by examiner

*Primary Examiner* — Arnel C Lavarias
(74) *Attorney, Agent, or Firm* — Lee & Morse, P.C.

(57) ABSTRACT

An antiglare film includes a transparent substrate, and an antiglare layer on the transparent substrate, the antiglare layer including a light-transmitting coating layer and an antiglare agent contained in the light-transmitting coating layer, the antiglare agent being composed of first antiglare particles and second antiglare particles overlapping each other.

21 Claims, 9 Drawing Sheets

TABLE 1

| Antiglare agent | Refractive index of first antiglare particle | Refractive index of second antiglare particle |
|---|---|---|
| 1 |  1.59 | 1.51 |

Figure 9

TABLE 2

| Example No. | Content of antiglare agent in total solids content (wt%) | Transparent substrate | Primary solvent | Secondary solvent | Thickness (μm) | Haze (%) | Transmittance (%) |
|---|---|---|---|---|---|---|---|
| 1 | 2.5 | PET | MIBK/MEK | MIBK | 3-4 | 4.83 | 91.90 |
| 2 | 2.5 | TAC | BA | PGMEA | 3-4 | 3.21 | 92.00 |
| 3 | 2.5 | TAC | IPA | PGMEA | 3-4 | 2.68 | 92.19 |
| 4 | 2.5 | PET | MIBK/MEK | MIBK | 5-6 | 9.38 | 90.98 |
| 5 | 2.5 | TAC | BA | PGMEA | 5-6 | 10.01 | 91.89 |
| 6 | 2.5 | TAC | IPA | PGMEA | 5-6 | 9.79 | 92.03 |
| 7 | 5 | PET | MIBK/MEK | PGMEA | 3-4 | 21.73 | 91.1 |
| 8 | 5 | TAC | BA | PGMEA | 3-4 | 23.8 | 91.32 |
| 9 | 5 | PET | MIBK | PGMEA | 5-6 | 19.64 | 91.10 |
| 10 | 5 | TAC | BA | PGMEA | 5 | 13.56 | 91.45 |
| 11 | 5 | TAC | IPA | PGME | 4 | 15.09 | 91.42 |
| 12 | 5 | PET | MIBK | PGMEA | 8-9 | 19.64 | 91.05 |
| 13 | 5 | TAC | BA | PGMEA | 9-10 | 14.57 | 91.54 |
| 14 | 5 | TAC | IPA | PGME | 8-9 | 28.06 | 91.24 |
| 15 | 5 | PET | MIBK | PGME | 9-10 | 21.78 | 91.23 |
| 16 | 5 | TAC | BA | MIBK/PGMEA/PGME | 8-9 | 34.81 | 92.18 |
| 17 | 5 | PET | MIBK/MEK | MIBK/PGMEA/PGME | 9-10 | 28.1 | 91.4 |
| 18 | 5 | PET | MIBK/MEK | CCH | 10 | 23.67 | 90.95 |
| 19 | 5 | TAC | BA | CCH | 10 | 24.3 | 91.75 |
| 20 | 5 | TAC | IPA | CCH | 10 | 21.74 | 91.92 |
| 21 | 8.33 | PET | MIBK/MEK | CCH/PGMEA | 7 | 27.99 | 93.56 |
| 22 | 8.33 | PET | MIBK/MEK | CCH/PGMEA | 8 | 33.79 | 93.05 |
| 23 | 8.33 | TAC | BA | CCH/PGMEA | 7-8 | 29.14 | 93.56 |

Figure 10

TABLE 3

| Example No. | Content of antiglare agent in total solids content (wt%) | Transparent substrate | Primary solvent | Secondary solvent | Thickness (μm) | Haze (%) | Transmittance (%) |
|---|---|---|---|---|---|---|---|
| 24 | 8.33 | TAC | BA | CCH/PGMEA | 9 | 35.16 | 92.96 |
| 25 | 8.33 | TAC | IPA | CCH/PGMEA | 7-8 | 31.28 | 92.34 |
| 26 | 8.33 | TAC | IPA | CCH/PGMEA | 9 | 36.1 | 92.62 |
| 27 | 8.33 | PET | MIBK/MEK | CCH/PGMEA/PGME | 6 | 30.04 | 93.44 |
| 28 | 8.33 | PET | MIBK/MEK | CCH/PGMEA/PGME | 8 | 41.77 | 93.34 |
| 29 | 8.33 | TAC | BA | PGMEA/PGME | 6 | 33.45 | 93.08 |
| 30 | 8.33 | TAC | BA | PGMEA/PGME | 8 | 43.13 | 93.21 |
| 31 | 8.33 | TAC | IPA | PGMEA | 6 | 26.46 | 92.13 |
| 32 | 8.33 | TAC | IPA | PGMEA | 8-9 | 28.5 | 91.79 |
| 33 | 8.33 | TAC | MIBK/MEK | PGMEA | 7-8 | 26.9 | 92.44 |
| 34 | 8.33 | PET | BA | PGMEA | 8-9 | 28.85 | 91.78 |
| 35 | 8.33 | TAC | IPA | PGMEA | 7 | 30.93 | 91.94 |
| 36 | 8.33 | PET | MIBK/MEK | CCH/PGMEA | 11-12 | 52.32 | 91.31 |
| 37 | 10 | TAC | BA | CCH/PGMEA | 9 | 51.59 | 92.54 |
| 38 | 10 | TAC | IPA | CCH/PGMEA | 10 | 49.48 | 92.66 |
| 39 | 10 | PET | MIBK/MEK | CCH/PGMEA | 5-6 | 53.22 | 91.13 |
| 40 | 30 | TAC | BA | CCH/PGMEA | 5 | 52.74 | 92.45 |
| 41 | 30 | TAC | IPA | CCH/PGMEA | 5 | 51.24 | 92.55 |

Figure 11

TABLE 4

| Kind of antiglare agent | Refractive index of first antiglare particle | Refractive index of second antiglare particle |
|---|---|---|
| 1  2.6 μm / 1.7 μm | 1.59 | 1.51 |
| 2  1.0 μm / 2.9 μm | 1.59 | 1.51 |
| 3  2.7 μm / 1.0 μm | 1.59 | 1.51 |
| 4  3.0 μm / 3.0 μm | 1.59 | 1.51 |

Figure 12

TABLE 5

| Example No. | Kind of antiglare agent | Content of antiglare agent in total solids content (wt%) | Transparent substrate | Primary solvent | Secondary solvent | Thickness (μm) | Total Haze (%) | Internal haze (%) | External haze (%) | Transmittance (%) |
|---|---|---|---|---|---|---|---|---|---|---|
| 42 | 1 | 8.33 | TAC | BA | PGMEA | 7 | 30.93 | 5.59 | 18.1 | 91.94 |
| 43 | 1 | 8.33 | TAC | BA | PGMEA | 8-9 | 29.45 | 7.15 | 24.3 | 91.84 |
| 44 | 1 | 10.0 | TAC | BA | PGMEA | 7 | 41.11 | 9.12 | 22.2 | 91.74 |
| 45 | 2 | 8.33 | TAC | BA | PGMEA | 7 | 33.91 | 5.01 | 14.8 | 91.87 |
| 46 | 2 | 8.33 | TAC | BA | PGMEA | 8 | 28.31 | 5.99 | 21.2 | 91.59 |
| 47 | 2 | 10.0 | TAC | BA | PGMEA | 7 | 39.43 | 7.71 | 19.6 | 91.31 |
| 48 | 3 | 8.33 | TAC | BA | PGMEA | 3-4 | 30.75 | 14.16 | 46.0 | 91.03 |
| 49 | 3 | 8.33 | TAC | BA | PGMEA | 6-7 | 36.54 | 21.43 | 58.6 | 92.38 |
| 50 | 3 | 10.0 | TAC | BA | PGMEA | 7 | 44.98 | 33.09 | 73.6 | 93.73 |
| 51 | 4 | 8.33 | TAC | BA | PGMEA | 4 | 30.26 | 9.61 | 31.8 | 91.41 |
| 52 | 4 | 8.33 | TAC | BA | PGMEA | 7 | 29.68 | 11.96 | 40.3 | 91.54 |
| 53 | 4 | 10.0 | TAC | BA | PGMEA | 7 | 40.66 | 14.01 | 34.5 | 91.67 |

Figure 13

TABLE 6

| Comparative Example No. | Content of antiglare agent in total solids content (wt%) | Transparent substrate | Primary solvent | Secondary solvent | Thickness (μm) | Haze (%) | Transmittance (%) |
|---|---|---|---|---|---|---|---|
| 1 | 0 | PET | MIBK/MEK | MIBK | 5-6 | 0.67 | 91.95 |
| 2 | 0 | TAC | BA | PGMEA | 5-6 | 0.89 | 92.14 |
| 3 | 0 | TAC | IPA | PGMEA | 5-6 | 0.98 | 92.38 |

ANTIGLARE FILM HAVING PARTICLES FOR USE IN A DISPLAY AND A METHOD FOR MANUFACTURING THE ANTIGLARE FILM

CROSS-REFERENCE TO RELATED APPLICATION

This application is a continuation of pending International Application No. PCT/KR2008/007782, entitled "Anti-Glare Film Comprising Anti-Glare Agent with a Shape Overlapped Two Anti-Glare Particles and Method of Manufacturing the Same," which was filed on Dec. 30, 2008, the entire contents of which are hereby incorporated by reference and for all purposes.

BACKGROUND

1. Field

Embodiments relate to an antiglare film for use in a display and a method for manufacturing the antiglare film.

2. Description of the Related Art

Displays, typified by liquid crystal displays (LCDs), plasma display panels (PDPs), cathode ray tubes (CRTs), and electroluminescent displays (ELDs), have widely been used in recent years. When such a display is used in outdoor environments or bright light conditions, external light such as sunlight or light from a fluorescent lamp is incident on and reflected from the surface of the display, which may degrade a perceived quality of the display.

SUMMARY

An embodiment is directed to an antiglare film, including a transparent substrate, and an antiglare layer on the transparent substrate, the antiglare layer including a light-transmitting coating layer and an antiglare agent contained in the light-transmitting coating layer, the antiglare agent being composed of first antiglare particles and second antiglare particles overlapping each other.

The first and second antiglare particles may be formed by bonding a seed of a first core to a seed of a second core and growing the first and second cores by polymerization, respectively, and the first antiglare particles may partially overlap the second antiglare particles at the center of the antiglare agent.

The second core may be selected from acrylic particles, methacrylic particles, acrylic-styrene copolymer particles, melamine particles, and polycarbonate particles, and the first core may be selected from styrene particles, polyvinyl chloride particles, and high refractive index acrylic particles.

The antiglare agent may have an overall diameter of about 3 to about 7 µm.

At least one of the first and second antiglare particles may be exposed by the light-transmitting coating layer.

The first and second antiglare particles may have different refractive indexes.

A refractive index difference between the first and second antiglare particles may be about 0.04 to about 0.1.

The first antiglare particles may have a refractive index of more than 1.57 to less than or equal to 1.62 and the second antiglare particles may have a refractive index of greater than or equal to 1.49 to less than or equal to 1.57.

The first antiglare particles may have a higher refractive index and a larger diameter than the second antiglare particles.

The first antiglare particles may have a higher refractive index and a smaller diameter than the second antiglare particles.

The first antiglare particles may have a same diameter as the second antiglare particles.

The light-transmitting coating layer may have a refractive index that is different from a refractive index of at least one of the first antiglare particles and the second antiglare particles.

The antiglare agent may be present in an amount of about 2.5 to about 30% by weight, based on the total solids content.

The antiglare layer may have a thickness of about 2 to about 20 µm.

The transparent substrate may include at least one of acetyl cellulose, diacetyl cellulose, triacetyl cellulose (TAC), propionyl cellulose, acetylpropionyl cellulose, nitrocellulose, polyethylene terephthalate (PET), polybutylene terephthalate, polyethylene naphthalate, poly-1,4-cyclohexanedimethylene terephthalate, polyethylene-1,2-diphenoxyethane-4,4'-dicarboxylate, cyclohexanedimethylene terephthalate, polyethylene, polypropylene, polymethylpentene, polymethyl methacrylate, polyvinyl chloride, polyvinylidene chloride, polyvinyl alcohol, polystyrene, polycarbonate (PC), polyamide, polyether sulfone, polyether ketone, polysulfone, and polyimide.

Another embodiment is directed to a method for producing an antiglare film, including mixing a hard coat agent, an antiglare agent composed of first antiglare particles and second antiglare particles overlapping each other, and a solvent to prepare a mixed solution, coating the mixed solution on a transparent substrate to form an antiglare layer in which a light-transmitting coating layer contains the antiglare agent, and drying and curing the antiglare layer.

Coating the mixed solution may be carried out by die coating, gravure coating, micro-gravure coating, wire bar coating, knife coating, slot die coating, or spin coating.

The drying may be carried out at a temperature of about 40 to about 100° C.

Another embodiment is directed to a display including an antiglare film according to an embodiment.

Another embodiment is directed to a display, including a display panel, and an antiglare layer on the display panel, the antiglare layer including a binding agent and a plurality of antiglare bodies in the binding agent, each respective body including at least a first polymer portion having a first refractive index and a second polymer portion having a second refractive index, the second refractive index being different from the first refractive index, the first polymer portion and the second polymer portion of each respective body being conjoined by covalent bonds therebetween.

BRIEF DESCRIPTION OF THE DRAWINGS

The above and other features and advantages will become more apparent to those of skill in the art by describing in detail example embodiments with reference to the attached drawings, in which:

FIGS. 8-13 illustrate Tables 1-6, respectively.

DETAILED DESCRIPTION

Figure 1:
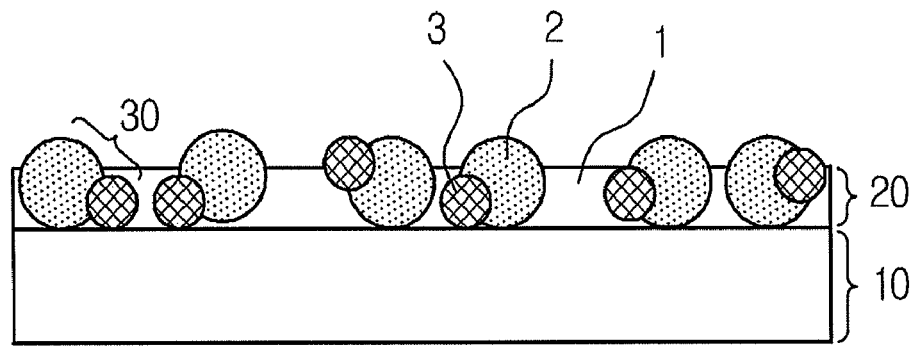
FIG. 1 illustrates a schematic diagram of an antiglare film according to an example embodiment, in which an antiglare agent is composed of two different kinds of antiglare particles, one of which has a higher refractive index and a larger diameter than the other.

Korean Patent Application No. 10-2008-0133621, filed on Dec. 24, 2008, in the Korean Intellectual Property Office, and entitled, "Anti-Glare Film Comprising Anti-Glare Agent with a Shape Overlapped Two Anti-Glare Particles and Method of Manufacturing the Same," is hereby incorporated herein by reference in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Unless otherwise defined, the term "total solids content" as used herein refers to the weight percentage of a coating layer formed after a composition comprising a hard coat agent, an antiglare agent, and a solvent is applied to a transparent substrate, dried, and cured, based on the total weight of the composition.

(A) Antiglare Film

Figure 2:
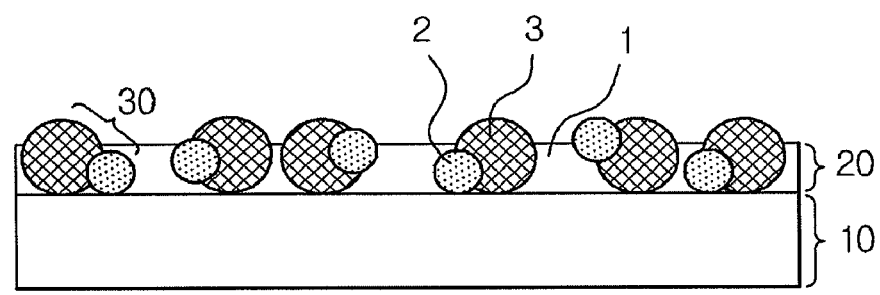
FIG. 2 illustrates a schematic diagram of an antiglare film according to another example embodiment, in which an antiglare agent is composed of two different kinds of antiglare particles, one of which has a higher refractive index and a smaller diameter than the other.
Figure 3:
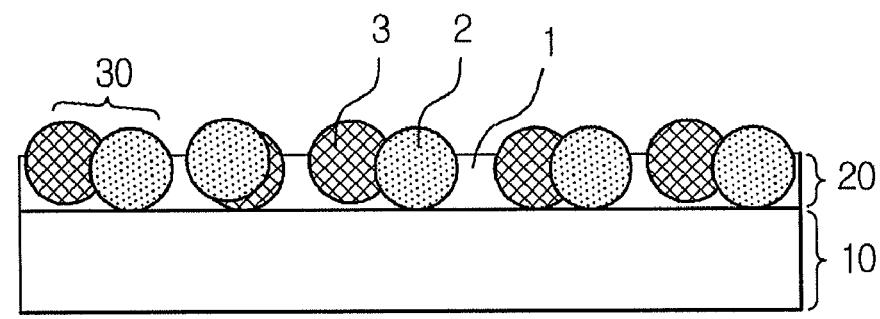
FIG. 3 illustrates a schematic diagram of an antiglare film according to another example embodiment, in which an antiglare agent is composed of two kinds of antiglare particles having different refractive indexes but the same diameter.

FIGS. 1 through 3 illustrate schematic cross-sectional diagrams of antiglare films according to example embodiments. More particularly, FIG. 1 illustrates a schematic diagram of an antiglare film according to an example embodiment, in which an antiglare agent is composed of two different kinds of antiglare particles, one of which has a higher refractive index and a larger diameter, and the other of which has a lower refractive index and a smaller diameter, relative to one another. FIG. 2 illustrates a schematic diagram of an antiglare film according to another example embodiment, in which an antiglare agent is composed of two different kinds of antiglare particles, one of which has a higher refractive index and a smaller diameter, and the other of which has a lower refractive index and a larger diameter, relative to one another. FIG. 3 illustrates a schematic diagram of an antiglare film according to another example embodiment, in which an antiglare agent is composed of two kinds of antiglare particles having different refractive indexes, relative to one another, but having the same diameter.

In the example embodiments shown in FIGS. 1 through 3, each of the antiglare films has a structure in which an antiglare layer 20 is laminated on a transparent substrate 10.

Any suitable transparent material may be used for the production of the transparent substrate 10. A polymeric material, i.e. a plastic film, is preferred in terms of processability.

Examples of materials suitable for the transparent substrate 10 include: celluloses, such as acetyl cellulose, diacetyl cellulose, triacetyl cellulose, propionyl cellulose, acetylpropionyl cellulose and nitrocellulose; polyesters, such as polyethylene terephthalate, polybutylene terephthalate, polyethylene naphthalate, poly-1,4-cyclohexanedimethylene terephthalate, polyethylene-1,2-diphenoxyethane-4,4'-dicarboxylate and cyclohexanedimethylene terephthalate; and polyolefins, such as polyethylene, polypropylene and polymethylpentene. Other examples of suitable materials include polymethyl methacrylate, polyvinyl chloride, polyvinylidene chloride, polyvinyl alcohol, polystyrene, polycarbonate, polyamide, polyether sulfone, polyether ketone, polysulfone, and polyimide. Of these, triacetyl cellulose (TAC), polyethylene terephthalate (PET), and polycarbonate (PC) are suitable materials for the transparent substrate of the optical film due to their high transparency. Triacetyl cellulose and polyethylene terephthalate (PET) may be used in, e.g., polarizing films for LCDs and optical filters for PDPs.

In the example embodiments shown in FIGS. 1 through 3, the antiglare layer 20 includes a light-transmitting coating layer 1 and an antiglare agent 30 contained in the light-transmitting coating layer 1. In an implementation, the antiglare agent 30 may consist of two different kinds of antiglare particles, i.e. a first antiglare particle 2 and a second antiglare particle 3, which overlap each other.

Figure 4:
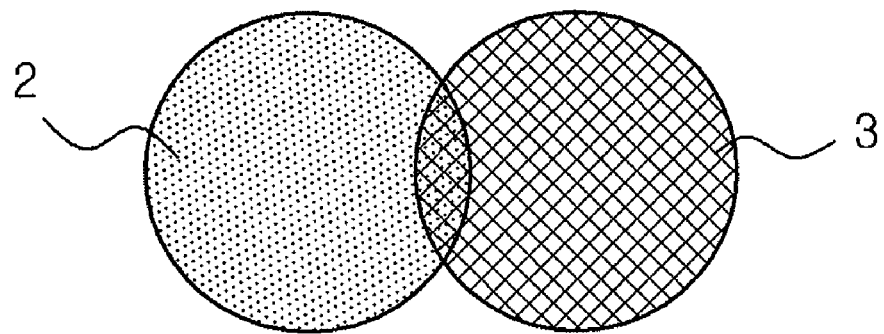
FIG. 4 illustrates a schematic diagram of an antiglare agent contained in an antiglare film according to an example embodiment, in which a first antiglare particle overlaps a second antiglare particle.

FIG. 4 illustrates a schematic diagram of an antiglare agent 30 contained in an antiglare film according to an example embodiment. In the antiglare agent 30 illustrated in FIG. 4, the first antiglare particle 2 overlaps the second antiglare particle 3.

The first and second antiglare particles 2 and 3 may be conjoined and may be formed by bonding, e.g., covalently bonding, a seed of a first core to a seed of a second core and growing the first and second cores by polymerization, respectively, such that a portion of the first antiglare particle 2 overlaps a portion of the second antiglare particle 3 at the center of the antiglare agent 30.

The second core may be selected from, e.g., acrylic particles (refractive index: 1.51), methacrylic particles (refractive index: 1.51), acrylic-styrene copolymer particles (refractive index: 1.55), melamine particles (refractive index: 1.57), and polycarbonate particles (refractive index: 1.57). The first core may selected from, e.g., styrene particles (refractive index: 1.59), polyvinyl chloride particles (refractive index: 1.60), and high refractive index acrylic particles (refractive index: 1.59). Herein, a high refractive index means a refractive index of more than 1.57.

Generally, a coating layer could be made with irregularities formed on the surface of the coating layer, or by utilizing internal scattering from a light-transmitting coating layer and light-transmitting polymer particles having different refractive indexes in the coating layer. For example, first and second antiglare particles (having different refractive indexes) could be mixed together and then used as light-transmitting polymer particles to utilize both external anti-glare properties and internal anti-glare properties.

In contrast, rather than merely mixing two kinds of antiglare particles together, embodiments may provide an antiglare film in which the first and second antiglare particles 2 and 3 are formed by bonding a seed of a first core to a seed of a second core, and growing the first and second cores by polymerization, respectively, so that a portion of the first antiglare particle 2 overlaps a portion of the second antiglare particle 3. Thus, the internal and external antiglare functions of the antiglare film 30 may be simultaneously controlled by using the antiglare agent in the form of single particles, i.e., by using conjoined first and second particles 2, 3.

The antiglare layer 20 preferably has a thickness of about 2 to about 20 μm, and more preferably about 2 to about 7 μm. The thickness of the antiglare layer 20 may be adjusted depending on the desired antiglare properties of the antiglare film and the mechanical properties (e.g., hardness) of the coating layer. If the antiglare layer is too thin, the hardness of the coating layer may be insufficient. If the antiglare layer is too thick, curling may occur in the film to deteriorate the external antiglare properties of the film.

Figure 5:
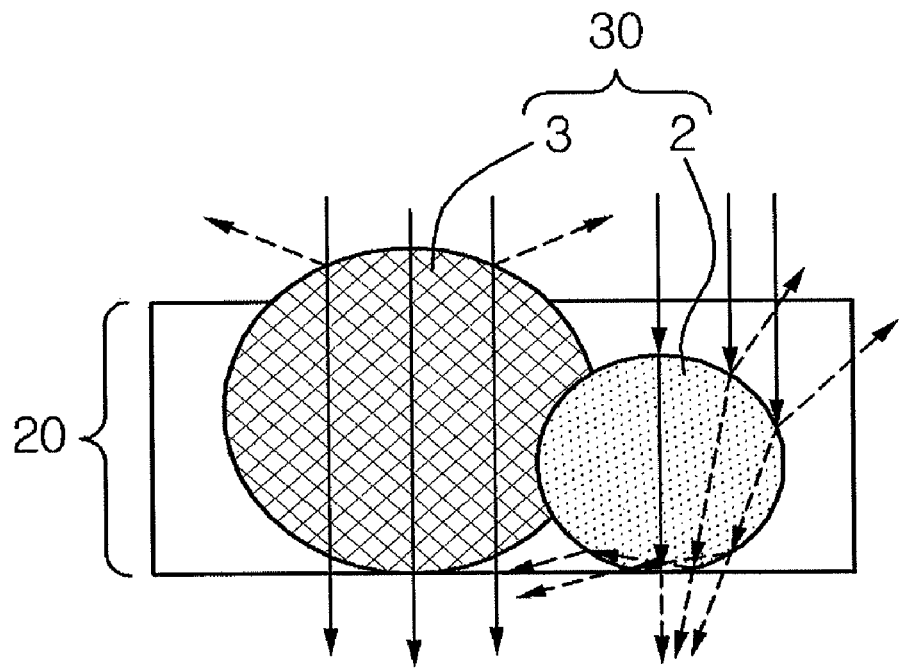
FIG. 5 illustrates a cross-sectional diagram showing a principle of antiglare functions of an antiglare film according to an example embodiment.

FIG. 5 illustrates a cross-sectional diagram showing a principle of antiglare function of an antiglare film according to an example embodiment. Referring to FIG. 5, an antiglare layer of the antiglare film includes an antiglare agent 30 composed of a first antiglare particle 2 and a second antiglare particle 3 overlapping each other and a light-transmitting coating layer 1. External light incident on the antiglare layer may scatter on the surface of the second antiglare particle 3 exposed to the surface of the light-transmitting coating layer 1 to impart external antiglare effects to the antiglare film. In addition, the light may be transmitted through the light-transmitting coating layer 1 and scatter at the interface between the light-transmitting coating layer 1 and the second antiglare particle 3 due to a refractive index difference to impart internal antiglare effects to the antiglare film.

In the example embodiment shown in FIG. 5, the first antiglare particle 2 has a refractive index different from that of the second antiglare particle 3. For example, the refractive index difference between the first antiglare particle 2 and the second antiglare particle 3 may be about 0.04 to about 0.1. The refractive index of the light-transmitting coating layer may be different from at least one of that of the first antiglare particle 2 and the second antiglare particle 3.

In an example embodiment, the refractive indexes of the first antiglare particle 2 and the second antiglare particle 3 are preferably more than 1.57 to less than or equal to 1.62, and greater than or equal to 1.49 to less than or equal to 1.57, respectively. The use of the second antiglare particle 3 having a relatively low refractive index helps contribute to an improvement in the external antiglare properties and transmittance of the antiglare film. The use of the first antiglare particle 2 having a relatively high refractive index helps contribute to an improvement in the internal antiglare properties and transmittance of the antiglare film.

The sizes of the first antiglare particle 2 and the second antiglare particle 3 may be varied depending on the desired internal and external antiglare properties of the antiglare film.

Figure 6:
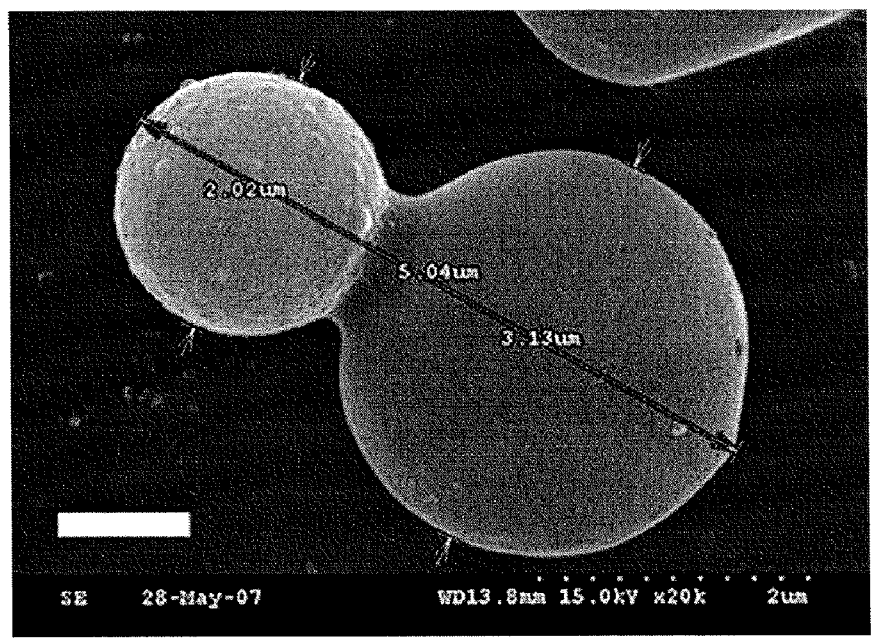
FIG. 6 illustrates a scanning electron microscopy (SEM) image showing an antiglare agent contained in an antiglare film according to an example embodiment.
Figure 7:
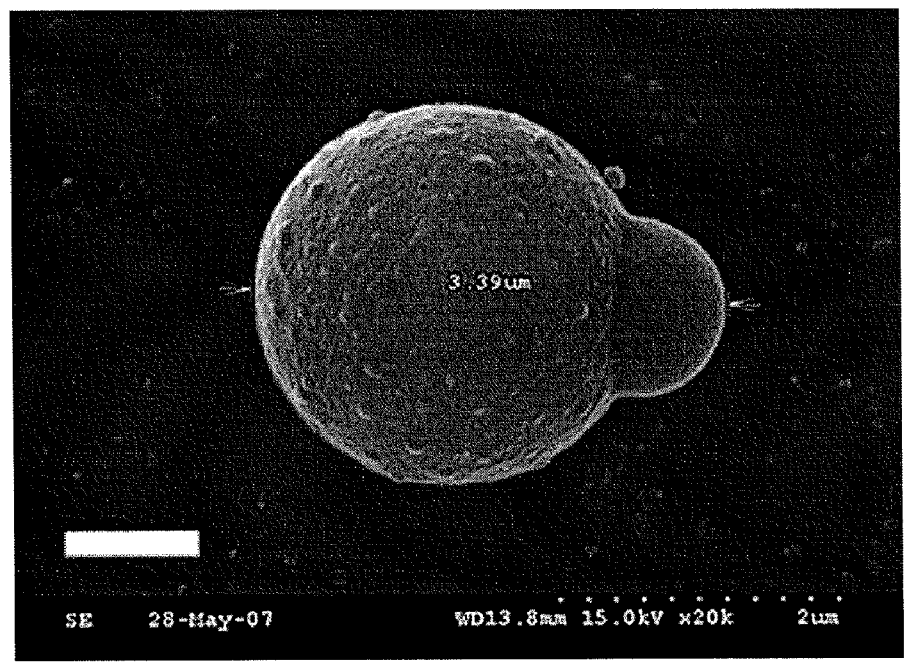
FIG. 7 illustrates is a SEM image showing an antiglare agent contained in an antiglare film according to another example embodiment.
Figure 8:
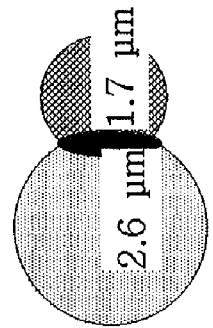

FIGS. 6 and 7 illustrate scanning electron microscopy (SEM) images showing the overall diameters of antiglare agents contained in antiglare films according to example embodiments.

The "overall diameter" of each of the antiglare agents means the distance between two end points of a straight line passing through the centers of first and second antiglare particles and extending to peripheries of the respective particles. In this regard, referring to FIG. 6, the sum of the diameters of the respective particles 2.02 μm+3.13 μm=5.15 μm) is larger than the overall diameter (5.04 μm) of the antiglare agent, indicating that the first and second antiglare particles constituting the antiglare agent overlap each other. According to an example embodiment, a preferred overall diameter of the antiglare agent, in which the first antiglare particle overlaps the second antiglare particle, is from 3 to 7 μm.

The overall diameter of the antiglare agent can be associated with the final thickness of the antiglare film. For example, an overall diameter of the antiglare agent smaller than 3 μm may result in a reduction in the thickness of the antiglare layer in order to control the external anti-glare properties of the first antiglare particle. Avoiding a thickness of the antiglare layer that is too small may help provide sufficient hardness. If the antiglare agent has an overall diameter larger than 7 μm and the antiglare layer becomes too thick, the likelihood of curling may increase, and such curling may deteriorate the external antiglare properties of the film.

The sizes of the respective antiglare particles constituting the antiglare agent may be varied depending on the required haze of the antiglare film, e.g., as illustrated in FIGS. 1 through 3. FIG. 1 illustrates a case in which the first antiglare particle has a higher refractive index and a larger diameter and the second antiglare particle has a lower refractive index and a smaller diameter, FIG. 2 illustrates a case in which the first antiglare particle has a higher refractive index and a smaller diameter and the second antiglare particle has a lower refractive index and a larger diameter, and FIG. 3 illustrates a case in which the first antiglare particle having a higher refractive index has the same diameter as the second antiglare particle having a lower refractive index.

In an embodiment, the haze of the antiglare film may be controlled by varying the difference in refractive index between the light-transmitting coating layer 1 and the antiglare agent 30 of the antiglare layer 20.

(B) Manufacture of Antiglare Film

Another example embodiment provides a method for producing an antiglare film. An antiglare film according to an embodiment may be prepared by dispersing the antiglare agent in a UV-curable hard coat agent, followed by coating, to ensure high scratch resistance, appearance uniformity, and high-speed coatability. The method may include: (a) mixing a hard coat agent, an antiglare agent composed of first antiglare particles and second antiglare particles overlapping each other, and a solvent to prepare a mixed solution; (b) coating the mixed solution on a transparent substrate to form an antiglare layer in which a light-transmitting coating layer contains the antiglare agent; and (c) drying and curing the antiglare layer.

The hard coat agent used in operation (a) may form the light-transmitting coating layer. The hard coat agent may contain a heat-and radiation-curable resin, a photopolymerization initiator, inorganic fine particles, a leveling agent, a surface modifier for the antiglare layer, and a silane coupling agent.

A compound having two or more functional groups may be used as the heat-and radiation-curable resin. Examples of such compounds include oligomers, monomers, and polymers that have polymerizable unsaturated bonds (e.g., methacryloyl and methacryloyloxy groups) or cationically polymerizable functional groups (e.g., epoxy groups) in the molecule thereof. These compounds may be used alone or may be mixed to prepare a composition. Preferably, the composition is in a liquid state before curing, and preferably has ethylenic and acrylic groups in the molecule thereof so as to be crosslinked by curing.

As the monomers, there may be exemplified 2-hydroxyethyl methacrylate, 2-hydroxypropyl methacrylate, tetrahydrofurfuryl acrylate, glycidyl methacrylate, acryloylmorpholine, 2-cyanomethacrylate, N,N-dimethylacrylamide, N-vinylpyrrolidone, N-vinyl-c-caprolactam, phenoxydiethyleneglycol methacrylate, pentaerythritol tetramethacrylate, dipentaerythritol trimethacrylate, trimethylolpropane trimethacrylate, trimethylolethane trimethacrylate, dipentaerythritol tetramethacrylate, erythritol dimethacrylate, pentaerythritol trimethacrylate, and 1,2,3-cyclohexane tetramethacrylate.

As the oligomers, there may be exemplified: a polyester methacrylate obtained by the reaction of a polyester polyol with methacrylic acid; and a urethane methacrylate obtained by the reaction of a bisphenol type epoxy resin with methacrylate, an organic polyisocyanate with hydroxymethacrylate, or a polyol, an organic polyisocyanate and a hydroxymethacrylate compound.

The compound having ethylenically unsaturated groups that can form a crosslinked product by curing preferably has functional groups selected from isocyanate, epoxy, aldehyde, carbonyl, hydrazine, carboxyl, methylol and active methylene groups. The crosslinking groups are not limited and may be reactive groups obtained from the decomposition of the functional groups. The compound having the crosslinking groups may undergo crosslinking by heat after coating.

The photopolymerization initiator contained in the hard coat agent may be used to cure the composition upon UV irradiation. Examples of the photopolymerization initiator include 1-hydroxycyclohexyl phenyl ketone, 2,2-dimethoxy-2-phenylacetophenone, xanthone, fluorinated ketone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide, and bis-(2,6-dimethoxybenzoyl)-2,4,4-trimethylpentylphosphine oxide. These photopolymerization initiators may be used alone or in combination of two or more thereof.

The amount of the photopolymerization initiator added is preferably about 0.5 to about 10% by weight and more preferably about 0.5 to about 5% by weight. Maintaining the amount of photopolymerization initiator added to about 0.5% by weight or more helps ensure that the hardness of the coating layer after curing of the curable composition is at a desired level. Maintaining the amount of photopolymerization initiator added to about 10% by weight or less helps ensure that the photopolymerization initiator itself does not react with radicals, which could inhibit the polymerization of the curable resin.

The inorganic fine particles contained in the hard coat agent may be used to control the refractive index of the antiglare layer and to make the film stronger after curing. The average size of the inorganic fine particles is preferably about 0.5 µm or less, and more preferably about 15 nm or less.

The inorganic fine particles may be selected from silicon dioxide, titanium dioxide, aluminum oxide, tin oxide, calcium carbonate, barium sulfate, talc, kaolin, and calcium sulfate particles. The inorganic fine particles are preferably added in an amount of about 10 to about 90% by weight, and more preferably about 30 to about 60% by weight, based on the total weight of the hard coat agent.

The hard coat agent may contain one or more of a fluorine and silicon-based leveling agent, which may avoid non-uniform flow during high-speed coating and non-uniform drying after coating, and helps ensure a good appearance free of imperfections (e.g., coating streaks and point defects) and coating uniformity. The hard coat agent may contain a surface modifier and a silane coupling agent for enhancing the dispersibility and bonding between the heat-and radiation-curable resin and the antiglare particles.

The solvent used in operation (a) may be a mixture of a primary solvent and a secondary solvent, which may be varied depending on the kind of the substrate to be coated. For example, when the substrate is a TAC film, a soluble and swellable solvent may be used as the secondary solvent. Specific examples of such soluble and swellable solvents include: ketones, such as methyl ethyl ketone, cyclohexanone, acetone, diacetone alcohol and polyhydric alcohols; ethers, such as methyl cellosolve, ethyl cellosolve, butyl cellosolve and cellosolve acetate; esters, such as methyl acetate and ethyl acetate; halogenated hydrocarbons, such as chloroform, methylene chloride and tetrachloroethane; nitrogenous compounds, such as nitromethane, acetonitrile, N-methylpyrrolidone and N,N-dimethylformamide; and other solvents, such as dimethylsulfoxide. These solvents may be used alone or as a mixture thereof. The primary solvent may be another suitable solvent.

The content of the solvent is preferably about 20 to about 100 parts by weight, and more preferably about 50 to about 100 parts by weight, based on 100 parts by weight of the curable resin. Maintaining the amount of solvent at about 10 parts by weight or more helps keep the viscosity of the composition from becoming too high and helps ensure uniform application of the composition to the substrate. Maintaining the amount of the solvent at about 100 parts by weight or less helps ensure that pinholes are not left after coating and drying.

In operation (b), the coating of the mixed solution on the substrate may be carried out by various wet processes, including roll coating, die coating, gravure coating, micro-gravure coating, wire bar coating, knife coating, slot die coating, and spin coating. Roll-to-roll processing may be suitably applied to the production of the antiglare film.

In operation (c), the drying may be carried out at a temperature of about 40 to about 100° C. to remove the solvent from the composition. After drying, the coating layer may be cured by UV light from a UV curing system to form an antiglare layer. The UV curing system may use a UV lamp, such as a high-pressure mercury lamp, a metal halide lamp, a xenon lamp, or a microwave electrodeless lamp. A wavelength range and an exposure dose required to cure the coating layer may be, e.g., about 200 to about 400 nm and about 100 to about 1,000 mJ/cm$^2$, respectively.

(C) Display

Another example embodiment provides a display including the antiglare film. The display may exhibit high anti-glare properties without loss of high-definition image quality and may have reduced surface reflectance to achieve maximum visibility.

The display may be, e.g., a cathode ray tube (CRT) display, a plasma display panel (PDP) display, an electroluminescent display (ELD), or a liquid crystal display (LCD). The antiglare film may be disposed on an outermost surface of the display to achieve low reflectance of the display. Taking advantage of the principle of optical interference, the antiglare film may prevent deterioration of contrast and visibility arising from the reflection of external light and the receipt of reflected images.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

EXAMPLES

Examples 1 to 41

First, a transparent hard coat agent (DIC, RC26-338), the antiglare agent (SX8707(C)-04, JSR) shown in Table 1, and solvents were mixed together to prepare a mixed solution.

Specifically, an antiglare film was produced by the following procedure. The hard coat agent was diluted with a primary solvent until the solid content reached 50 parts by weight. After the antiglare agent particles were added to the primary dilution, the mixture was diluted with a secondary solvent until the final mixed solution had a desired solids content.

A mixture of methyl isobutyl ketone and methyl ethyl ketone (MIBK/MEK) as ketone-based solvents was used as the primary solvent when a PET film was used as a transparent substrate, and a mixture of butyl acetate (BA) and isopropyl alcohol (IPA) was used as the primary solvent when a TAC film was used as a transparent substrate.

Methyl isobutyl ketone (MIBK), propylene glycol monomethyl ether acetate (PGMEA), propylene glycol monomethyl ether (PGME), or cyclohexanone (CCH) was used as the secondary solvent.

Subsequently, the mixed solution was coated on the transparent substrate to form an antiglare layer in which the antiglare agent was contained in a light-transmitting coating layer. A wire bar coater was used to coat the mixed solution on the transparent substrate.

Thereafter, the antiglare layer was dried in a dryer, followed by UV curing. The drying temperature was adjusted between 40° C. (initial temperature) and 100° C. depending on the volatility of the solvents. The UV curing conditions were varied depending on the curability of the hard coat agent and the total exposure dose was adjusted to 500 mJ/cm$^2$.

The specific reaction conditions are shown in Tables 2 and 3. The haze and transmittance values of the films produced in Examples 1-41 were measured and the results are shown in Tables 2 and 3.

Examples 42 to 53

First, a transparent hard coat agent (DIC, RC26-338), one of the four antiglare agents (SX8707(C)-04, JSR) shown in Table 4, and solvents were mixed together to prepare a mixed solution. Each of the antiglare agents consisted of two different kinds of antiglare particles, i.e. first antiglare particles and second antiglare particles, which had different sizes. The characteristics of the antiglare agents were compared and evaluated.

Specifically, an antiglare film was produced by the following procedure. The hard coat agent was diluted with a primary solvent until the solid content reached 50 parts by weight. After the antiglare agent particles were added to the primary dilution, the mixture was diluted with a secondary solvent until the mixed solution had a desired solids content.

A TAC film was used as a transparent substrate and butyl acetate was used as the primary solvent. Propylene glycol monomethyl ether acetate (PGMEA) was used as the secondary solvent. Subsequently, the mixed solution was coated on the transparent substrate to form an antiglare layer in which the antiglare agent was contained in a light-transmitting coating layer. A wire bar coater was used to coat the mixed solution on the transparent substrate.

Thereafter, the antiglare layer was dried in a dryer, followed by UV curing. The drying temperature was adjusted between 40° C. (initial temperature) and 100° C. depending on the volatility of the solvents. The UV curing conditions were varied depending on the curability of the hard coat agent and the total exposure dose was adjusted to 500 mJ/cm$^2$.

The specific reaction conditions are shown in Table 5. The haze and transmittance values of the films produced in Examples 42-53 were measured and the results are shown in Table 5.

Comparative Examples 1 to 3

To evaluate the functions of the antiglare agents, hard coating films containing no antiglare agent were produced by the following procedure.

First, a transparent hard coat agent (DIC, RC26-338), a primary solvent, and a secondary solvent were mixed together to prepare a mixed solution.

A mixture of methyl isobutyl ketone and methyl ethyl ketone (MIBK/MEK) as ketone-based solvents was used as the primary solvent when a PET film was used as a transparent substrate, and a mixture of butyl acetate (BA) and isopropyl alcohol (IPA) was used as the primary solvent when a TAC film was used as a transparent substrate.

Propylene glycol monomethyl ether acetate (PGMEA) or methyl isobutyl ketone (MIBK) was used as the secondary solvent.

Subsequently, the mixed solution was coated on the transparent substrate, dried, and cured. A roll-to-roll coater was used to coat the mixed solution on the transparent substrate. The drying temperature was adjusted between 40° C. (initial temperature) and 100° C. depending on the volatility of the solvents. The UV curing conditions were varied depending on the curability of the hard coat agent and the total exposure dose was adjusted to 500 mJ/cm$^2$.

The specific reaction conditions are shown in Table 6. The haze and transmittance values of the films produced in Comparative Examples 1-3 were measured, and the results are shown in Table 6.

Analysis—Haze and Transmittance Measurements

The haze and transmittance values of the films produced in Examples 1-53 and Comparative Examples 1-3 were measured using a haze meter (Nippon Denshoku Kogyo Co.).

The internal haze and the external haze of each of the films were measured using a pressure-sensitive adhesive. The total haze of the film was defined as the sum of the internal haze and the external haze:

Internal haze+External haze=Total haze

Specifically, an optical double-sided pressure-sensitive adhesive (PSA) film was adhered to the antiglare (AG) layer of the film under pressure. The pressure-sensitive surface of the PSA film was attached to the glass surface. The haze of the resulting structure was measured using the haze meter. The results are shown in Tables 2, 3, 5, and 6.

The results in Tables 2, 3, 5, and 6 show that the antiglare films of Examples 1-53 had a total light transmittance of 88% or above and a total haze value of 4 to 53%. In addition, the internal haze values of the films accounted for 74% or less of the respective total haze values. Particularly, the total light transmittance values of the antiglare films of Examples 1-53 were comparable to, or higher than, those of the antiglare films of Comparative Examples 1-3 containing no antiglare agent. Further, the internal and external haze values of the films of Examples 1-53 could be freely controlled by varying the sizes of the first and second antiglare particles of the antiglare agents and the amounts of the antiglare agents added. Thus, an antiglare film according to an embodiment may exhibit excellent characteristics in terms of transmittance and haze.

By way of summation and review, there is a need for films that prevent external light from being reflected from display surfaces. A number of antireflective films and antiglare films may be used in displays, e.g., antiglare films treated in such a manner as to have rough surfaces. General methods for the antiglare treatment of antiglare films can be broadly divided into two types: (1) surface roughening of an antiglare film by physical processing during curing to form a hard coat layer thereon, and (2) mixing of a hard coat agent with inorganic particles and organic particles as antiglare agents to form a hard coat layer. However, such films may suffer from problems in that the choice of raw materials may be limited and the antiglare properties may be difficult to control.

As described above, embodiments may provide an antiglare film including an anti-glare agent that has a shape of two overlapping anti-glare particles, a method of manufacturing the film, and a display including the film. The antiglare film may include a transparent substrate and an antiglare layer laminated on the transparent substrate, wherein the antiglare layer includes a light-transmitting coating layer and an antiglare agent contained in the light-transmitting coating layer. The antiglare agent may be a plurality of single particles, each of which is composed of a first antiglare particle and a second antiglare particle overlapping each other. An antiglare film according to an embodiment may be capable of controlling both external anti-glare properties and internal anti-glare properties. The antiglare film may help ensure high sharpness of transmitted images, and may provide a high total light transmittance and exhibit good antiglare functions.

The antiglare film according an embodiment may be simple to manufacture as compared to a film using an antiglare agent that is a mixture of two or more different particles or materials. Further, embodiments may allow the shape and content of the antiglare agent and the thickness of the coating layer to be suitably varied according to the intended antiglare properties of the antiglare film. Further, the internal haze of the antiglare film with respect to the total haze may be adjusted in a broad range using of the antiglare agent in the form of single particles.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An antiglare film, comprising:
   a transparent substrate; and
   an antiglare layer on the transparent substrate, the antiglare layer including a light-transmitting coating layer and an antiglare agent contained in the light-transmitting coating layer, the antiglare agent being composed of first antiglare particles and second antiglare particles overlapping each other, wherein the first and second antiglare particles have different refractive indexes.

2. The antiglare film as claimed in claim 1, wherein the first and second antiglare particles are formed by bonding a seed of a first core to a seed of a second core and growing the first and second cores by polymerization, respectively, and the first antiglare particles partially overlap the second antiglare particles at a center of the antiglare agent.

3. The antiglare film as claimed in claim 2, wherein:
   the second core is selected from acrylic particles, methacrylic particles, acrylic-styrene copolymer particles, melamine particles, and polycarbonate particles, and
   the first core is selected from styrene particles, polyvinyl chloride particles, and high refractive index acrylic particles.

4. The antiglare film as claimed in claim 1, wherein the antiglare agent has an overall diameter of about 3 to about 7 µm.

5. The antiglare film as claimed in claim 4, wherein at least one of the first and second antiglare particles is exposed by the light-transmitting coating layer.

6. The antiglare film as claimed in claim 1, wherein a refractive index difference between the first and second antiglare particles is about 0.04 to about 0.1.

7. The antiglare film as claimed in claim 1, wherein the first antiglare particles have a refractive index of more than 1.57 to less than or equal to 1.62 and the second antiglare particles have a refractive index of greater than or equal to 1.49 to less than or equal to 1.57.

8. The antiglare film as claimed in claim 1, wherein the first antiglare particles have a higher refractive index and a larger diameter than the second antiglare particles.

9. The antiglare film as claimed in claim 1, wherein the first antiglare particles have a higher refractive index and a smaller diameter than the second antiglare particles.

10. The antiglare film as claimed in claim 1, wherein the first antiglare particles have a same diameter as the second antiglare particles.

11. The antiglare film as claimed in claim 1, wherein the light-transmitting coating layer has a refractive index that is different from a refractive index of at least one of the first antiglare particles and the second antiglare particles.

12. The antiglare film as claimed in claim 1, wherein the antiglare agent is present in an amount of about 2.5 to about 30% by weight, based on a total solids content of the antiglare layer.

13. The antiglare film as claimed in claim 1, wherein the antiglare layer has a thickness of about 2 to about 20 µm.

14. The antiglare film as claimed in claim 1, wherein the transparent substrate includes at least one of acetyl cellulose, diacetyl cellulose, triacetyl cellulose (TAC), propionyl cellulose, acetylpropionyl cellulose, nitrocellulose, polyethylene terephthalate (PET), polybutylene terephthalate, polyethylene naphthalate, poly-1,4-cyclohexanedimethylene terephthalate, polyethylene-1,2-diphenoxyethane-4,4'-dicarboxylate, cyclohexanedimethylene terephthalate, polyethylene, polypropylene, polymethylpentene, polymethyl methacrylate, polyvinyl chloride, polyvinylidene chloride, polyvinyl alcohol, polystyrene, polycarbonate (PC), polyamide, polyether sulfone, polyether ketone, polysulfone, and polyimide.

15. A display comprising the antiglare film as claimed in claim 1.

16. The antiglare film as claimed in claim 1, wherein:
the first and second antiglare particles are formed by bonding a seed of a first core to a seed of a second core and growing the first and second cores by polymerization, respectively, and the first antiglare particles partially overlap the second antiglare particles at a center of the antiglare agent,
the antiglare agent has an overall diameter of about 3 to about 7 μm,
the first and second antiglare particles have different refractive indexes,
the antiglare agent is present in an amount of about 2.5 to about 30% by weight, based on a total solids content of the antiglare layer,
the antiglare layer has a thickness of about 2 to about 20 μm, and
the transparent substrate includes at least one of acetyl cellulose, diacetyl cellulose, triacetyl cellulose (TAC), propionyl cellulose, acetylpropionyl cellulose, nitrocellulose, polyethylene terephthalate (PET), polybutylene terephthalate, polyethylene naphthalate, poly-1,4-cyclohexanedimethylene terephthalate, polyethylene-1,2-diphenoxyethane-4,4'-dicarboxylate, cyclohexanedimethylene terephthalate, polyethylene, polypropylene, polymethylpentene, polymethyl methacrylate, polyvinyl chloride, polyvinylidene chloride, polyvinyl alcohol, polystyrene, polycarbonate (PC), polyamide, polyether sulfone, polyether ketone, polysulfone, and polyimide.

17. The antiglare film as claimed in claim 1, wherein at least one of the first antiglare particles and at least one of the second antiglare particles are conjoined by covalent bonds therebetween.

18. A method for producing an antiglare film, comprising:
mixing a hard coat agent, an antiglare agent composed of first antiglare particles and second antiglare particles overlapping each other, and a solvent to prepare a mixed solution;
coating the mixed solution on a transparent substrate to form an antiglare layer in which a light-transmitting coating layer contains the antiglare agent; and
drying and curing the antiglare layer;
wherein the first and second antiglare particles have different refractive indexes.

19. The method as claimed in claim 18, wherein coating the mixed solution is carried out by die coating, gravure coating, micro-gravure coating, wire bar coating, knife coating, slot die coating, or spin coating.

20. The method as claimed in claim 18, wherein the drying is carried out at a temperature of about 40 to about 100° C.

21. A display, comprising:
a display panel including a transparent substrate; and
an antiglare layer on the display panel, the antiglare layer including a light transmitting coating layer and a plurality of antiglare bodies in the light transmitting coating layer, each respective body including at least a first polymer particle having a first refractive index and a second polymer particle having a second refractive index, the second refractive index being different from the first refractive index, the first polymer particle and the second polymer particle of each respective body are overlapping such that the first polymer particle and the second polymer particle of each respective body are conjoined by covalent bonds therebetween.

* * * * *